United States Patent
Garrett et al.

(10) Patent No.: US 10,481,332 B2
(45) Date of Patent: Nov. 19, 2019

(54) FREE SPACE VARIABLE OPTICAL ATTENUATOR WITH INTEGRATED INPUT/OUTPUT POWER MONITORS

(71) Applicant: II-VI Incorporated, Saxonburg, PA (US)

(72) Inventors: Mark H. Garrett, Morgan Hill, CA (US); Mark Filipowicz, Scotts Valley, CA (US); Siegfried Fleischer, Los Gatos, CA (US)

(73) Assignee: II-VI Delaware, Inc., Wilmington, DE (US)

( * ) Notice: Subject to any disclaimer, the term of this patent is extended or adjusted under 35 U.S.C. 154(b) by 178 days.

(21) Appl. No.: 15/412,116

(22) Filed: Jan. 23, 2017

(65) Prior Publication Data

US 2018/0210151 A1    Jul. 26, 2018

(51) Int. Cl.
| | |
|---|---|
| *G02B 6/26* | (2006.01) |
| *G02B 6/42* | (2006.01) |
| *G01J 1/04* | (2006.01) |
| *G01J 1/42* | (2006.01) |
| *G02B 26/08* | (2006.01) |

(52) U.S. Cl.
CPC ............ *G02B 6/266* (2013.01); *G01J 1/0414* (2013.01); *G01J 1/0425* (2013.01); *G01J 1/0437* (2013.01); *G01J 1/4228* (2013.01); *G01J 1/4257* (2013.01); *G02B 6/4286* (2013.01); *G02B 26/0833* (2013.01); *G02B 6/4214* (2013.01)

(58) Field of Classification Search
CPC ........ G02B 6/266; G02B 6/4208; G02B 6/32; G02B 6/4214; G02B 26/0816; G02B 6/4286; G02B 26/0833; G01J 1/4228; G01J 1/0437; G01J 1/0414; G01J 1/0425; G01J 1/4257
See application file for complete search history.

(56) References Cited

U.S. PATENT DOCUMENTS

| | | | | |
|---|---|---|---|---|
| 3,302,027 | A * | 1/1967 | Fried .......................... | G02F 1/21 356/486 |
| 5,307,337 | A * | 4/1994 | Woloszczuk ........... | G11B 7/126 369/116 |
| 6,137,941 | A | 10/2000 | Robinson | |
| 6,538,816 | B2 | 3/2003 | Fuchs et al. | |
| 6,614,982 | B2 | 9/2003 | Barrett | |
| 6,625,377 | B2 | 9/2003 | Chang | |
| 6,819,815 | B1 * | 11/2004 | Corbalis .............. | G02B 6/3588 385/16 |

(Continued)

Primary Examiner — Que Tan Le
Assistant Examiner — Jennifer D Bennett
(74) Attorney, Agent, or Firm — Wendy W. Koba

(57) ABSTRACT

A free space variable optical attenuator (VOA) utilizes a beamsplitter to create tap beams (of both the input signal and the beam-steered output signal) that are directed into monitoring photodiodes. The beamsplitter is configured to exhibit a non-equal splitting ratio such that the tap beams are only a relatively small portion of the input/output beams. The free space configuration eliminates the need for fiber-based couplers, splices and connections to external monitors, as required in prior art VOA monitoring systems. The VOA utilizes a voltage-controlled, MEMS-based tilt mirror to provide beam steering of the propagating, free space beam in a known manner to introduce attenuation (power reduction) in the output signal.

10 Claims, 7 Drawing Sheets

(56) References Cited

U.S. PATENT DOCUMENTS

| | | | |
|---|---|---|---|
| 7,054,537 B2 | 5/2006 | Lim et al. | |
| 7,346,240 B1 | 3/2008 | He et al. | |
| 7,408,639 B1 * | 8/2008 | Strasser | G02B 6/2706 356/328 |
| 8,538,229 B1 | 9/2013 | Wang et al. | |
| 8,737,778 B2 | 5/2014 | Wang et al. | |
| 8,879,918 B1 | 11/2014 | Wang et al. | |
| 2002/0085806 A1 * | 7/2002 | Pezeshki | G02B 6/32 385/31 |
| 2002/0109076 A1 * | 8/2002 | Tochio | G02B 6/3588 250/214 SW |
| 2003/0161604 A1 * | 8/2003 | Sufleta | G02B 6/266 385/140 |
| 2004/0091229 A1 | 5/2004 | Li et al. | |
| 2004/0101319 A1 * | 5/2004 | Choi | H04B 10/572 398/196 |
| 2005/0047745 A1 | 3/2005 | Ao et al. | |
| 2008/0205845 A1 | 8/2008 | Wang et al. | |
| 2009/0103867 A1 | 4/2009 | Huang et al. | |
| 2011/0125460 A1 * | 5/2011 | Suzuki | G21K 1/093 702/179 |
| 2017/0099531 A1 * | 4/2017 | Colbourne | H04Q 11/0005 |

\* cited by examiner

FREE SPACE VARIABLE OPTICAL ATTENUATOR WITH INTEGRATED INPUT/OUTPUT POWER MONITORS

TECHNICAL FIELD

The present invention relates to a variable optical attenuator (VOA) and, more particularly, to a VOA configuration that utilizes integrated optical tap monitors provided in a free space configuration.

BACKGROUND OF THE INVENTION

Variable optical attenuators (VOAs) are common components used in optical communication networks. For example, a power level of an optical signal may need to be reduced to meet certain operational requirements. In particular, it may be desirable to maintain a uniform power level for different WDM channels in a communication system. In an optical amplifier, it may be desired to maintain a uniform gain profile over a wavelength range of interest. In some cases, it may be necessary to control (limit) the power level of an output signal to remain within a predetermined dynamic range of an optical detector. In any of these situations (or many others), there is a need to provide "active" adjustment of the output power level of one optical signal relative to others. Variable optical attenuators serve this purpose.

One common VOA technology is based on the use of a micro-electro-mechanical (MEMS) device to perform beam steering in a manner that controls the power coupled into an output signal path (i.e., controls the attenuation between the input and output paths). The typical VOA component includes an input optical fiber, lens, MEMS tilting mirror and an output optical fiber. The lens focuses the input light onto the MEMS tilting mirror, with the light reflected from the mirror then directed into the output fiber. A voltage is applied to the MEMS tilting mirror, where the voltage amplitude controls the tilt angle of the mirror. By varying the voltage (and, therefore, the tilt angle), the position of the reflected spot on the output fiber is varied. With the output spot aligned to the center of the output fiber's core, the attenuation is minimal (limited only by insertion loss, typically about 0.5 dB). As the output spot of the beam of reflected light is misaligned relative to the output fiber core (that is, as the tilt angle of the MEMS mirror changes), the amount of light launched into the output fiber core is reduced, providing a higher level of attenuation. The maximum attenuation can be 30 dB or higher, mainly limited by the tilt range of the mirror.

Control of the attenuation provided by a VOA is generally achieved by using an external system of discrete components for monitoring both the power going into the VOA and the power exiting the VOA. This external monitoring system typically includes input and output power monitors, with each separate power monitor including an external, fiber-based tap coupler and an associated photodiode. A determination of the relative difference in measured input and output powers is fed back to a controller that sets the voltage applied to the MEMS mirror, and thus the tilt angle required to achieve the required loss (attenuation) of the VOA.

With an on-going emphasis to provide "small form factor" optical components, it is desirable to integrate the monitoring function with the VOA itself. However, combining the individual, discrete components of a conventional monitoring system into the constrained size of a packaged VOA is problematic. Thus, a need remains in the art for a VOA configuration that is efficient and accurate, yet is able to meet the packaging limitations of small form factor configurations.

SUMMARY OF THE INVENTION

The needs remaining in the prior art are addressed by the present invention, which relates to a variable optical attenuator (VOA) and, more particularly, to a VOA configuration that utilizes integrated optical tap monitors provided in a free space configuration.

In accordance with the present invention, a free space VOA utilizes a beamsplitter to create tap beams (of both the input signal and the beam-steered output signal) that are directed into monitoring photodiodes. The beamsplitter is configured to exhibit a non-equal splitting ratio such that the tap beams are only a relatively small portion of the input/output beams. The free space configuration eliminates the need for fiber-based couplers, splices and connections to external monitors, as required in prior art VOA monitoring systems. The free space VOA of the present invention utilizes a voltage-controlled, MEMS-based tilt mirror to provide beam steering of the propagating, free space beam in a known manner to introduce attenuation (power reduction) in the output signal.

In one embodiment, a pin hole element is used in conjunction with an output monitoring photodiode. The aperture size of the pin hole element is used in conjunction with the known diameter of the output fiber core region to determine the calibration factor required to calculate the output power based upon the measured power at the monitoring photodiode (positioned beyond the pin hole element). In one case, the aperture may exhibit the same diameter as the core (thus, a calibration factor of 1:1). Alternatively, the pin hole aperture may be twice the diameter of the core (thus, a calibration factor of 2:1). In general, any ratio is acceptable, as long as it is known and remains constant over time.

In another embodiment of the present invention, the need for a separate pin hole element is eliminated by instead forming an absorbent coating on an outer perimeter of the monitoring photodiode active region such that the transparent inner area of the active region can be calibrated in size to the core region of the output fiber.

Various embodiments of the present invention utilize a separate input tap monitor to measure the power level of the incoming optical signal. The beamsplitter directs a small portion of the incoming signal into an input monitoring photodiode, with the majority of the incoming free-space beam passing through the beamsplitter and impinging the MEMS tilt mirror. A filter/isolator may be included in the free space path between the beamsplitter and input monitoring photodiode to prevent reflections from re-entering the beamsplitter and increasing the noise figure of the integrated VOA.

Instead of using a separate input tap monitor, a split detector monitoring arrangement may be utilized, with a pair of monitoring photodiodes disposed in a side-by-side configuration along the beam path of the tapped-out portion of the output signal. The sum of the power measured by the pair of monitoring photodiodes can be used to determine the input power (by knowing the splitting ratio of the beamsplitter), and the output power measured as in the above-described embodiments.

A particular embodiment of the present invention takes the form of a free space variable optical attenuator with integrated power monitoring comprising a MEMS-based adjustable position tilt mirror for providing beam steering of an input free space beam to create a beam-steered output free space beam, the degree of steering defined by the adjustable position of the tilt mirror; a beamsplitter for dividing free space beams into a major portion passing through the beamsplitter and a minor portion re-directed along an orthogonal monitoring path, the beamsplitter disposed in optical alignment with the MEMS-based tilt mirror; and a monitoring arrangement responsive to the minor portions of the input free space beam and the beam-steered output free space beam for measuring input and output power levels to determine the amount of attenuation created by the position of the tilt mirror.

Other and further embodiments of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

As mentioned above, problems with current MEMS-based, fiber-coupled VOAs with input and output power taps include at least the following: 1) the assembly of the VOA with the input and output taps exceeds the "small form factor" requirement; and 2) the assembly itself requires the formation of a number of fiber splices, which introduces uncontrollable loss into the system (while also adding assembly time and expense to the process).

Figure 1:
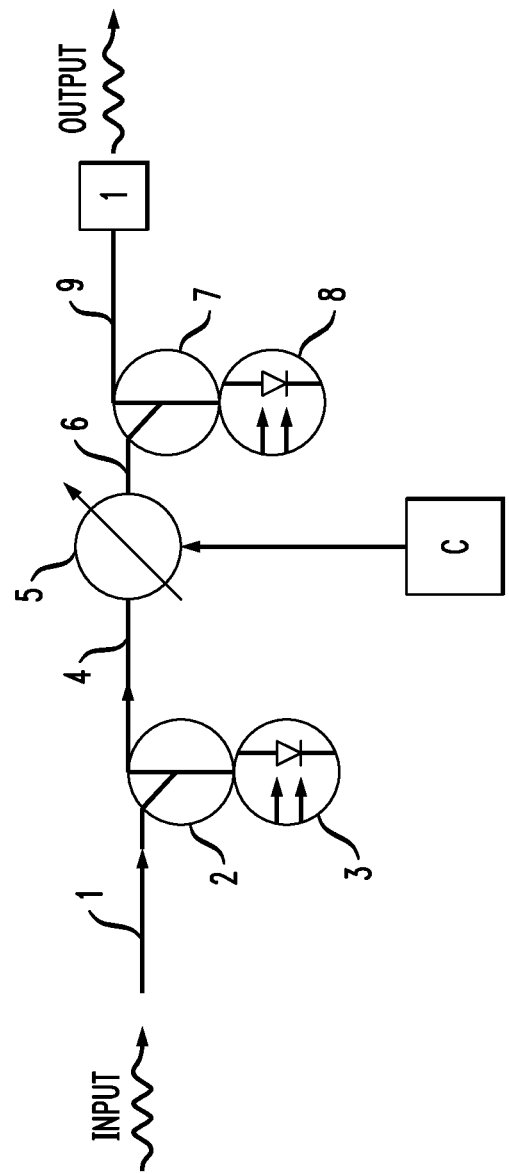
FIG. 1 illustrates a prior art, multi-component VOA including discrete input and output optical taps.

FIG. 1 illustrates a conventional prior art VOA assembly based upon these discrete components. Here, an incoming optical signal propagates along an input fiber 1, with a portion of the signal removed via an input optical tap 2 and applied as a "monitoring" input to an input photodetector 3. The optical tap typically comprises a fiber-based arrangement that is spliced with both an input fiber and an output fiber. The remainder of the incoming optical signal is coupled into an optical signal path 4 (which may be an optical fiber, free space, or any other suitable type of waveguide) and applied as an input to a MEMS-based VOA 5. The details of the VOA itself are not shown in FIG. 1, but include lenses and the MEMS tilting mirror.

The attenuated optical output signal from VOA 5 is coupled into an optical fiber 6, as shown in FIG. 1. An output optical tap 7 (similar in construction to input optical tap 2) is used to remove a portion of the attenuated signal propagating along optical fiber 6 (for monitoring purposes), where the removed portion is applied as an input to a monitoring photodetector 8. The remainder of the attenuated optical signal is coupled into output optical fiber 9, and exits the arrangement as the output of the VOA assembly. Also shown in FIG. 1 is a controller C that is coupled to MEMS-based VOA 5 and used to control the tilt of the included mirror to provide the amount of beam steering required for the specific attenuation level.

As mentioned above, this combination of discrete, external components required to monitor the operation of a VOA (e.g., multiple fibers requiring splices and alignments), results in the formation of a relatively large-sized system that is expensive to manufacture and maintain. Moreover, the number and size of the various discrete monitor components results in the creation of a VOA and monitor sub-assembly that cannot readily satisfy small form-factor requirements.

Figure 2:
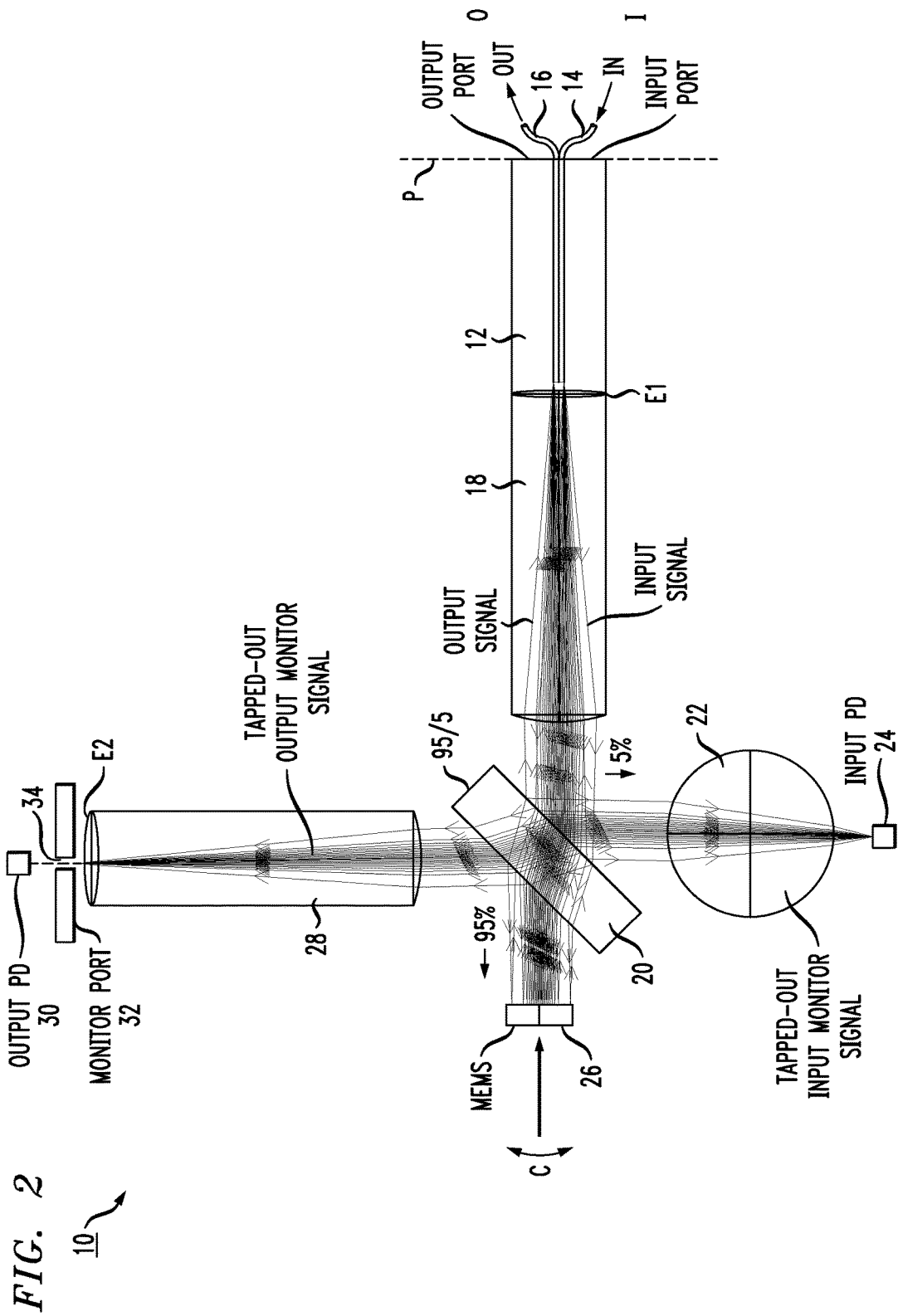
FIG. 2 is a diagram of an exemplary integrated tap VOA formed in accordance with the present invention.

FIG. 2 illustrates an exemplary free space VOA 10 with an integrated input/output power monitor formed in accordance with the present invention. As will be discussed below, by virtue of using free space optics, the integrated configuration is able to fit within the footprint of small form factor packages, while maintaining the ability to perform variable attenuation and remain stable in its performance over an extended period of time. In the particular embodiment shown in FIG. 2, the attenuation present along the output signal path (for example, at an "output port" of VOA 10) can be determined by measuring (with proper calibration) the amount of light that passes through a pin hole aperture along a monitoring signal path (also referred to as a "monitor port" of VOA 10). When the MEMS mirror rotates, the "spot" on the output fiber and the "spot" at the pin hole aperture shift by the same amount (i.e., through the same arc) such that the power coupled into the output fiber and passing through the pin hole aperture both reduce in value. Therefore, measurements of optical power at the monitor port can be used to accurately determine the optical power at the output port.

In the particular embodiment of FIG. 2, free space VOA 10 utilizes a dual-fiber pigtail 12 (or similar dual-path component) to introduce an input optical signal I to VOA 10 and provide an exit path for attenuated output optical signal O from VOA 10. In this case, input signal I is introduced via an input optical fiber 14 and the attenuated output signal O exits VOA 10 along an output optical fiber 16. One advantage of the integrated configuration of the present invention is that the input and output signal paths terminate along a common plane P of the assembly.

Continuing with a description of free space VOA 10, the incoming optical signal passes through a first lens element 18, which in this direction functions to collimate the expanding beam incoming signal. The collimated, free space beam thereafter impinges a beamsplitter 20. In accordance with the present invention, beamsplitter 20 is configured to function as an optical tap so that the majority of the free space beam will pass through, with only a small fraction of the beam re-directed into a monitoring photodiode. For example, a "95/5" beamsplitter may be used, with 95% (of the measured power) of the free space beam passing through beamsplitter 20 and 5% of the power of the input free space beam re-directed into a monitoring photodiode. It is to be understood that other suitable splitting ratios may be preferred for specific circumstances. The small, re-directed fraction of the collimated free space beam input is shown in FIG. 2 as passing through a focusing lens 22 and entering an input monitoring photodiode 24. By measuring the power received at input photodiode 24 and knowing the splitting ratio of beamsplitter 20, a value of the total input power may be determined.

The major portion of the incoming optical signal passes through beamsplitter 20 and is thereafter directed as a free space beam into a MEMS device 26. As described above and well-known in the art, a MEMS device includes a mirrored surface that may be adjusted (that is, changing the angle of tilt of the mirror surface) to function as a beam steering device. For the purposes of using such a MEMS device in a VOA, the steering of the beam controls the amount of the optical signal that is coupled into the core region of the output optical fiber. Thus, changes in the tilt of the MEMS mirror allows for the beam to be steered with respect to the core region of an output fiber in a manner such that only a fraction of the signal couples into the core (thereby introducing attenuation into the output signal coupled into the output fiber). It is to be understood that this "beam steering" is very, very slight—typically on the order of one micron or less (for coupling into a core of about 20 µm in diameter).

The beam-steered optical signal (also referred to at times as the "return path optical signal") reflected off of MEMS device 26 is shown in FIG. 2 as passing again through beamsplitter 20, with a major portion of the beam-steered optical signal re-entering lens 18. In this direction, lens 18 functions to focus the return path free space beam, and thereafter couple it into output fiber 16 exiting dual core fiber pigtail 12 at the output port of VOA 10.

In accordance with the present invention, the amount of attenuation associated with the position of the tilt mirror of MEMS device 26 is efficiently determined by using an integrated monitoring arrangement. Still referring to FIG. 2, beamsplitter 20 again functions as an optical tap, and re-directs a portion of the beam-steered output beam from MEMS device 26 into a focusing lens 28 and toward an output photodiode 30. As shown, the focused beam exiting lens 28 first passes through a pin hole element 32 before entering photodetector 30. Pin hole element 32 includes an aperture 34, where the dimensions of aperture 34 are configured to exhibit a known relationship with the diameter of the core region of output fiber 16. For example, aperture 34 may be formed to have a diameter essentially equal to the diameter of core region; alternatively, aperture 34 may be formed to have a diameter twice the value of the diameter of the core region. The actual value of the diameter of aperture 34 is irrelevant (within reason), as long as the relationship between the diameter of aperture 34 and the diameter of the core region of output fiber 16 is known and remains constant. For the purposes of this discussion, the relationship between these two values is defined as a "calibration factor".

In accordance with this exemplary embodiment of the present invention, the beam steering action of MEMS device 26 functions to shift the position of the output beam along exit plane E1 of lens element 18. Similarly, this same beam steering action functions to shift the position of the "tapped" beam along exit plane E2 of second lens element 28.

Presuming the properties of lenses 18 and 28 are matched, planes E1 and E2 are conjugate planes and, therefore, measurements of power level beyond lens 28 is an accurate representation of the power level beyond lens 18. Therefore, in accordance with this embodiment of the present invention, the presence of pin hole element 32 mimics the placement of the core region of output optical fiber 16 with respect to the beam-steered output signal. Thus, by measuring the optical power passing through aperture 34 of pin hole element 32, and knowing the calibration factor between aperture 34 and output fiber 16, the actual optical power coupled into output fiber 16 can be determined. Therefore, the measured values of the input and output power can be used in a known manner to determine the attenuation level provided by free space VOA 10.

Figure 3:
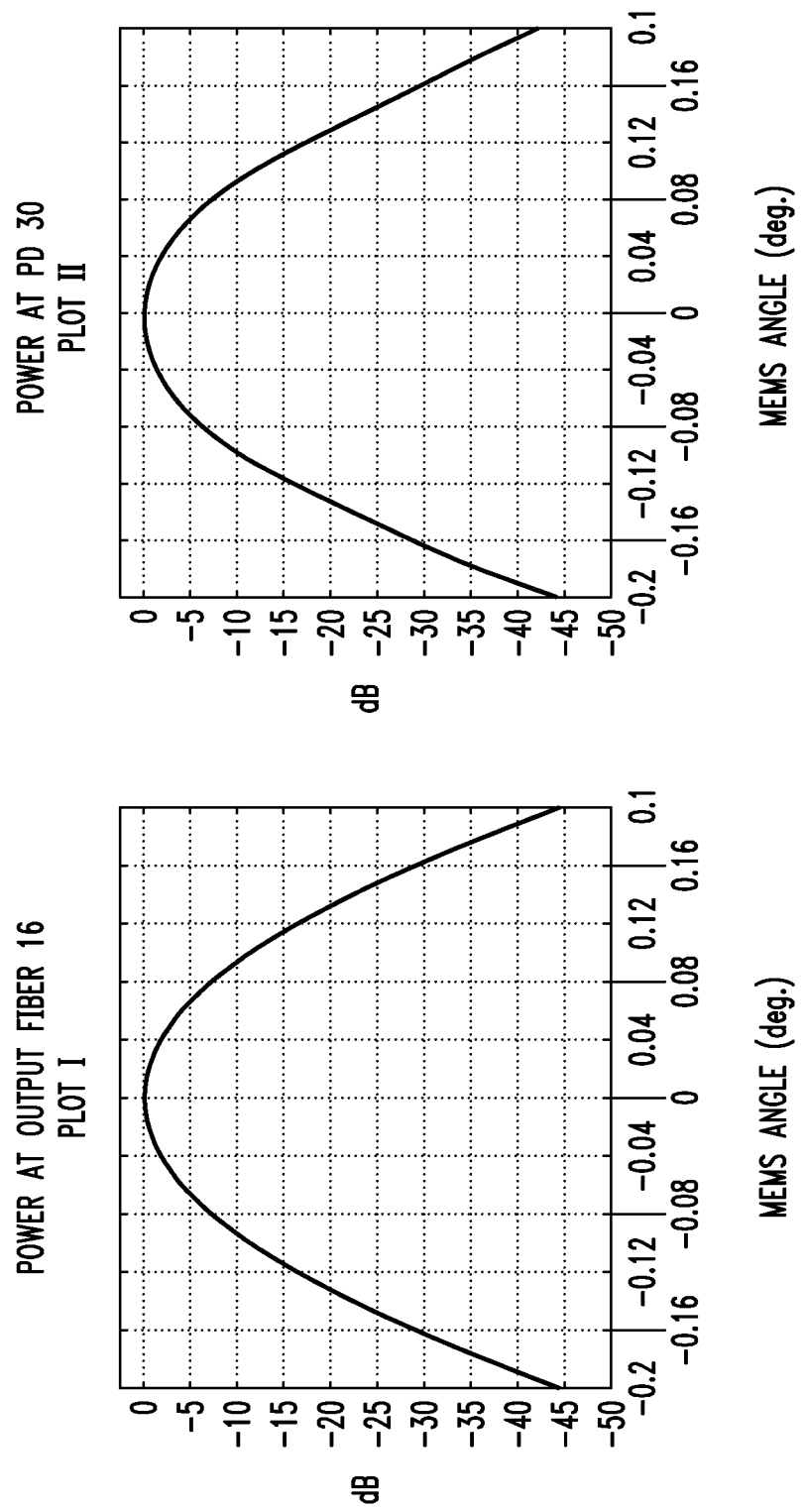
FIG. 3 contains graphs comparing the change in power at the output fiber as a function of mirror tilt to the change in power at the output photodiode.

FIG. 3 illustrates the performance of this conjugate plane configuration of the present invention. In particular, FIG. 3 includes a first plot (labeled as Plot I) of the optical power measured at output fiber 16 as a function of the tilt angle of MEMS device 26 (measured in dB, along a change in angle from −0.2° to +0.2°). The second plot in FIG. 3 (labeled as Plot II) is a measurement of the optical power measured at photodiode 30 across this same range of tilt angle change. The two plots are essentially identical. This result provides assurance that the use of the power level measurements at photodiode 30 is truly representative of the optical power coupled into output fiber 16.

Figure 4:
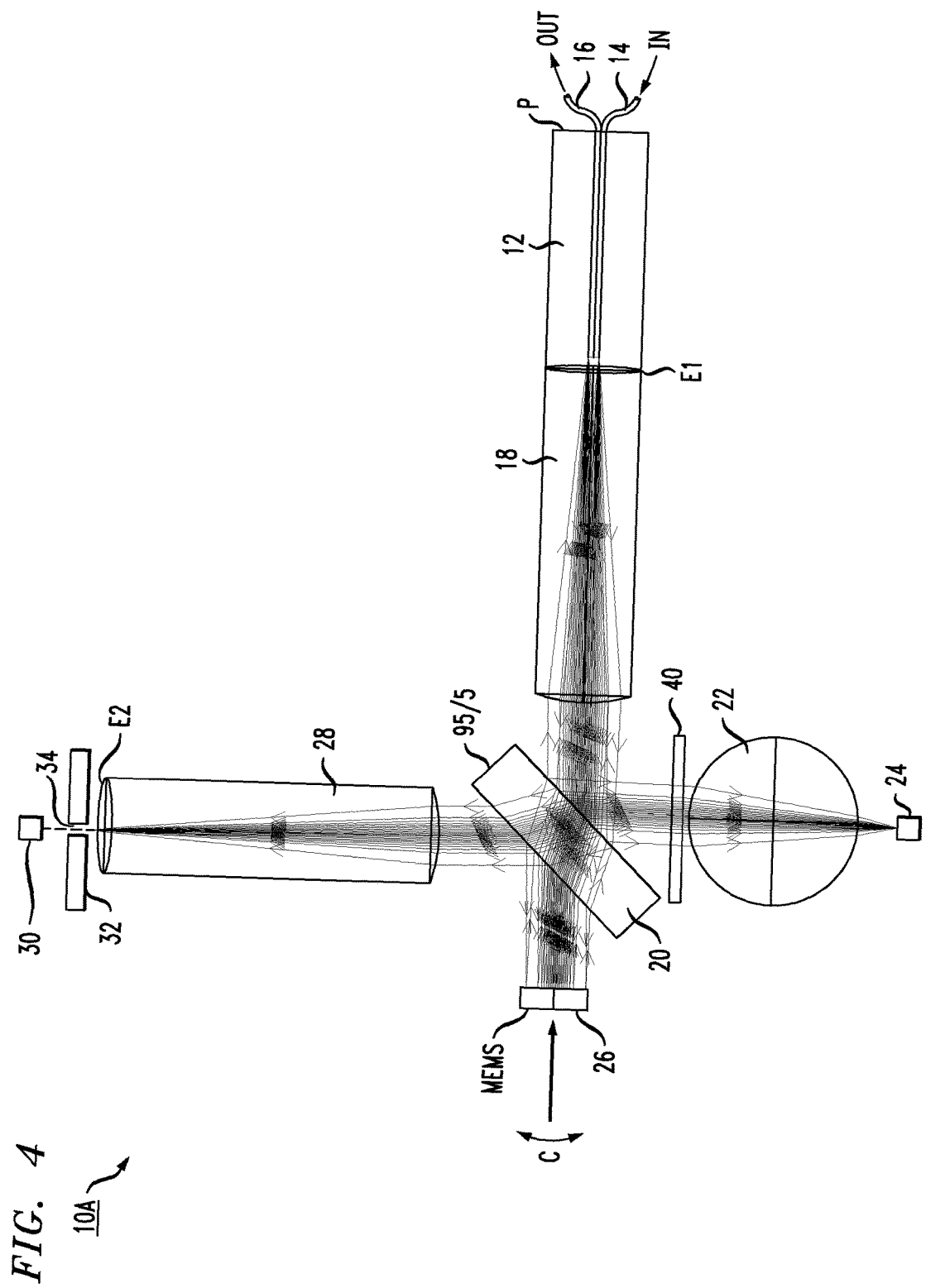
FIG. 4 is a diagram of an alternative embodiment of the present invention.

FIG. 4 illustrates an alternative embodiment of the present invention, referred to as free space VOA 10A, which is configured to include integrated input/output power monitors. The various elements of VOA 10 that are replicated in VOA 10A carry the same reference numerals. Indeed, the operation of free space VOA 10A is essentially the same as that described above, with the changes in output power level created by MEMS device 26 being accurately measured by photodiode 30 (by virtue of having conjugate planes E1 and E2). In this particular embodiment illustrating free space VOA 10A, an isolator element 40 is inserted in the path between beamsplitter 20 and spherical lens 22. Isolator element 40 functions to prevent any scattered free space beams from entering input photodiode 24. The various reflective surfaces in VOA 10A result in multiple beams to be scattered in a variety of directions, and the presence of isolator element 40 prevents these scattered beams from propagating any further in the system.

Figure 5:
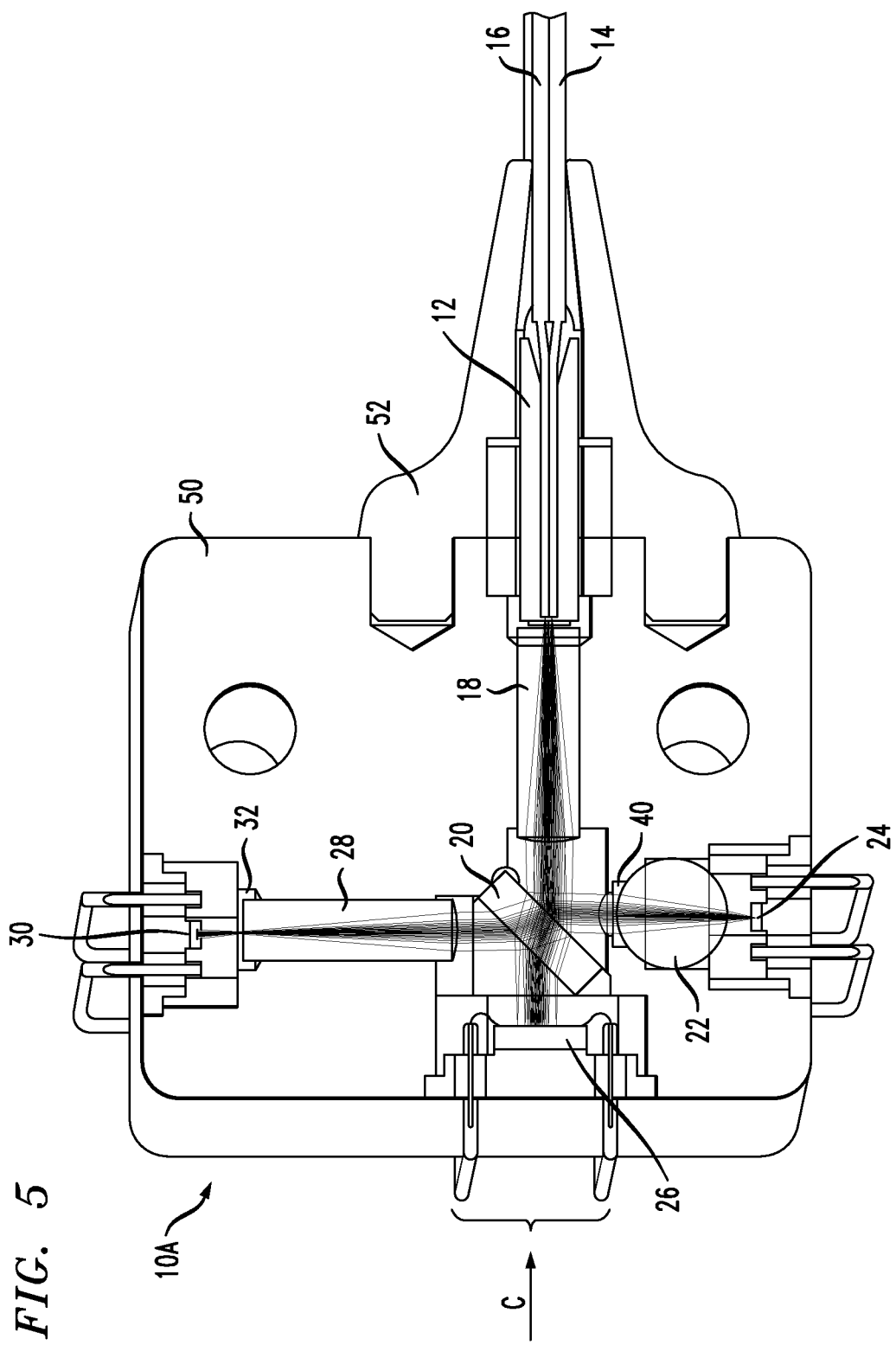
FIG. 5 is a depiction of the embodiment of FIG. 4 as housed within a small form factor package.

FIG. 5 illustrates an exemplary configuration of free space VOA 10A of FIG. 4 as housed within a small form factor enclosure. As shown, the individual components comprising free space VOA 10A are disposed within recesses formed within a package housing support 50 (formed of Invar, or a similar material, for example). The various electrical connections to MEMS device 26, input monitoring photodiode 24 and output monitoring photodiode 30 are also shown in this view. A strain relief enclosure 52 is shown as well, and used to prevent movement of dual-fiber pigtail 12 with respect to lens element 18. Advantageously, no optical fiber segments are required to provide signal paths within the VOA.

Evident in the configuration of FIG. 5 is the capabilities of the free-space VOA of the present invention to provide a compact, robust VOA with integrated monitoring functionality within the confined space requirements of a small form factor package. The use of beamsplitter 20 as a tap element to re-direct free space monitoring beams into their respective photodiodes (while also controlling the movement of the free space beams between the dual-fiber pigtail and the MEMS mirror) is critical in creating this integrated configuration.

Figure 6:
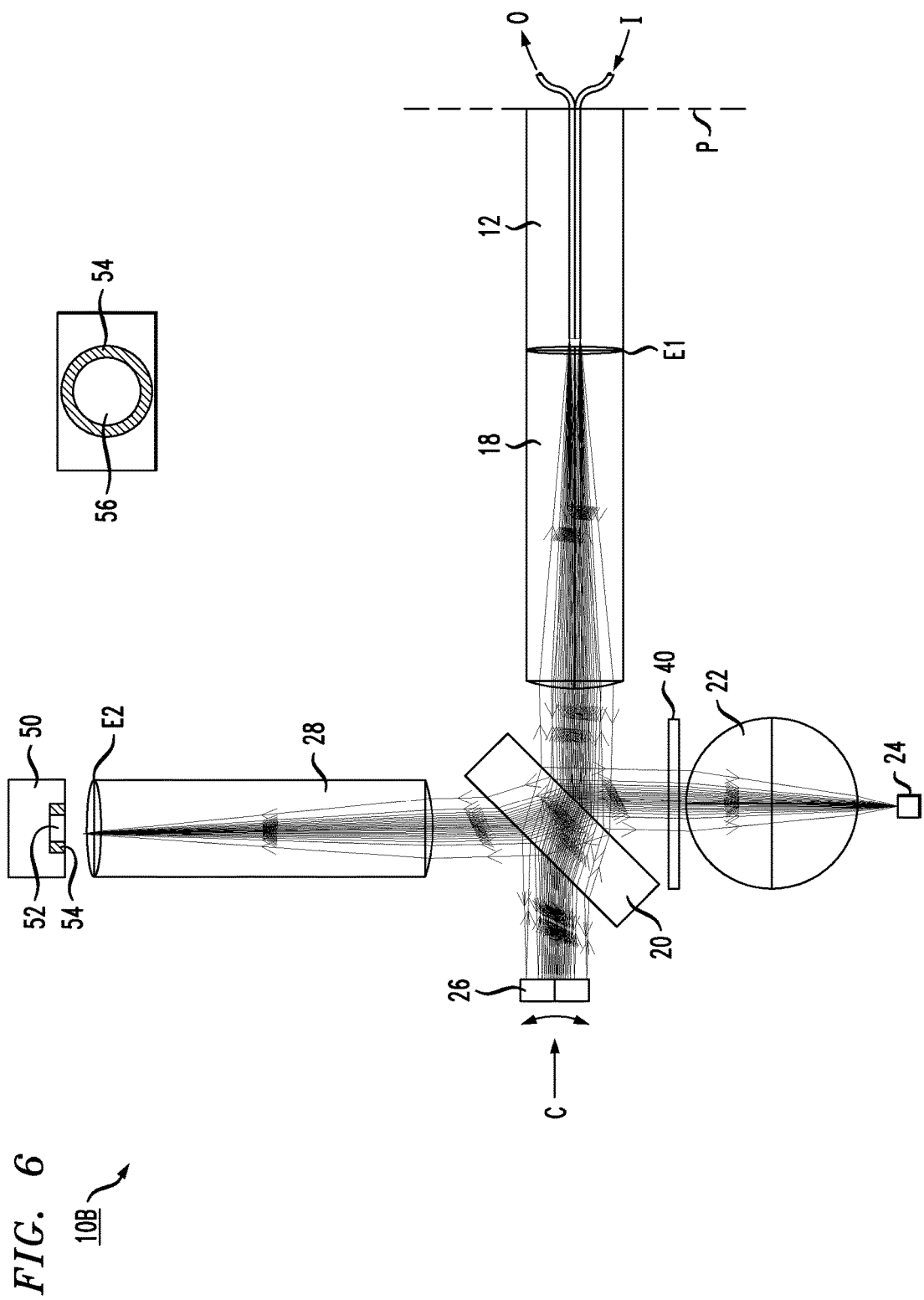
FIG. 6 is a diagram of yet another embodiment of the present invention, in this utilizing a coated photodiode within the output photodetector.

An alternative embodiment of the present invention, referred to as free space VOA 10B, is shown in FIG. 6. In this embodiment, the combination of the pin hole element and output monitoring photodiode is replaced by a photodetector 50 comprising a photodiode 52 including an absorbing coating 54 disposed around an outer perimeter of the active region (as shown in the inset to FIG. 6), allowing only a central area 56 of the active region to be receptive to light impinging the surface of photodiode 52. The presence of coating 54 functions in the same manner as the pin hole element discussed above, blocking off-axis rays from entering the active region of photodiode 52.

Therefore, as long as the diameter of central area 56 is known, a calibration factor between central area 56 and the core region of output fiber 16 can be determined and used to provide an accurate measurement of the output power. The utilization of a coated photodiode in this embodiment thus eliminates the need for a separate pin hole element and reduces the number of components required to be manufactured and assembled in the final free space VOA arrangement.

Figure 7:
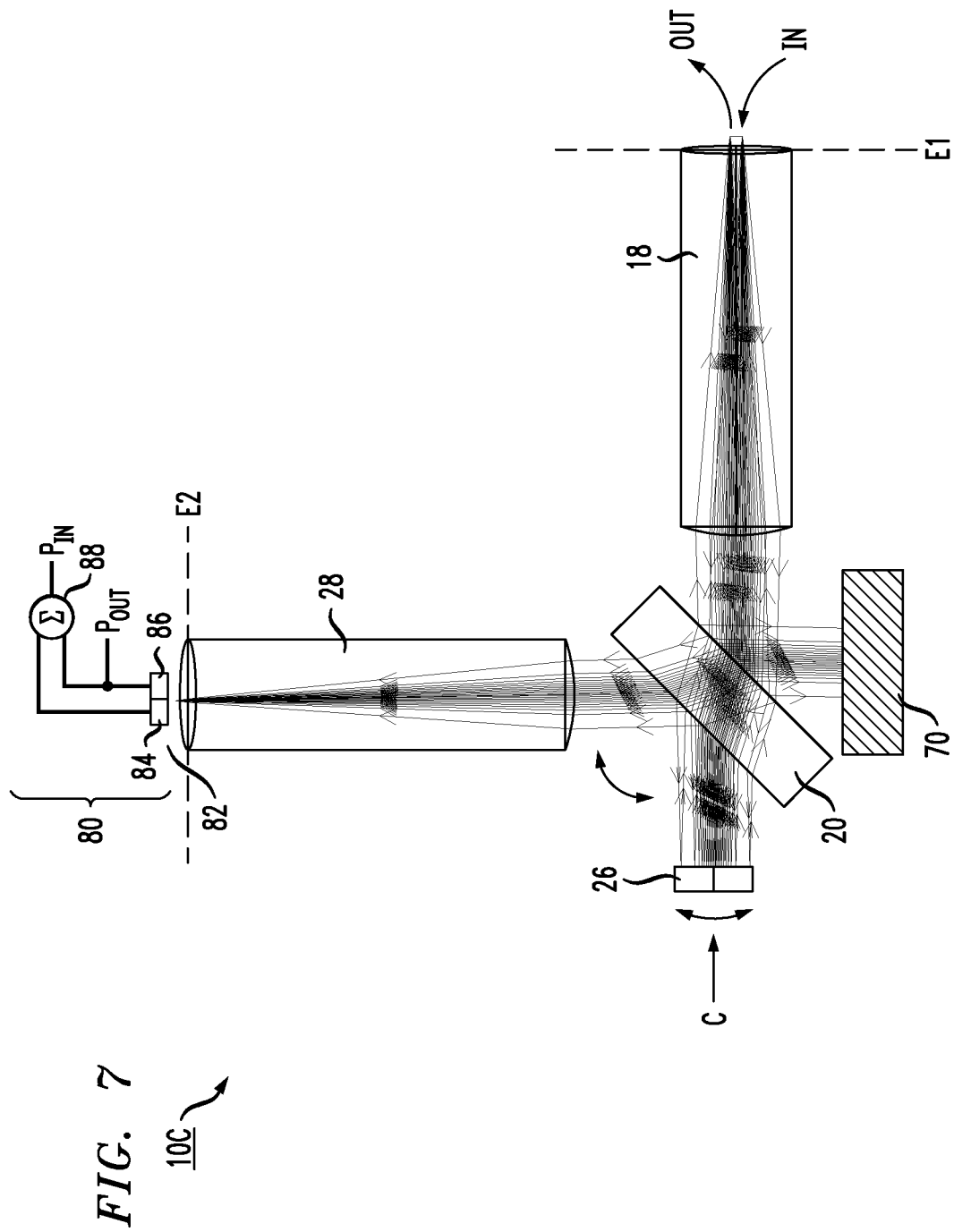
FIG. 7 is a diagram of an alternative embodiment of the present invention, using a single monitoring element (including a pair of photodiodes) to provide monitoring of both the input and output signals.

Another embodiment of the present invention provides further reduction in the number of required components by utilizing a "split detector" monitoring arrangement to provide measurements of both input power and output power. FIG. 7 illustrates an exemplary free space VOA 10C, formed to include an integrated monitoring arrangement comprising a split detector configuration.

Referring to FIG. 7, it is evident that the input monitoring photodiode configuration of the above-described embodiments has been eliminated. Instead, an absorbing component 70 is utilized to prevent reflections of the tapped-out free space beam from interfering with the operation of VOA 10C. Advantageously, free space VOA 10C is formed to include a monitoring arrangement 80 including a split detector 82 to provide measurements indicative of both the input power and output power. As with the embodiment 10B of FIG. 6, free space VOA 10C does not utilize a pin element.

In accordance with this particular embodiment of the present invention, split detector 82 comprises a pair of photodiodes 84, 86 arranged in a side-by-side arrangement as shown in FIG. 7. A combiner 88 is used to receive the output signals from both photodiodes 84 and 86, where the combination of both is indicative of the "total" signal power, (i.e. indicative of the input signal power) and shown as $P_{IN}$ in FIG. 7. The output from monitoring photodiode 86 functions in a manner similar to the above-described embodiments to provide an indication of the output signal power (shown as $P_{OUT}$ in FIG. 7).

The present invention has been described in sufficient details with a certain degree of particularity. It is to be understood by those skilled in the art that the present disclosure of embodiments has been made by way of examples only and that numerous changes in the arrangement and combination of parts may be resorted to without departing from the spirit and scope of the invention as defined by the claims appended hereto.

What is claimed is:

1. A free space variable optical attenuator with integrated power monitoring comprising
   a MEMS-based adjustable position tilt mirror for providing beam steering of an input free space beam to create a beam-steered output free space beam, the degree of steering defined by the adjustable position of the tilt mirror, the input free space beam arriving along an input signal path and the beam-steered output free space beam exiting along an output signal path, the input and output, signal paths terminating along a common plane P of the free space variable optical attenuator;
   a single beamsplitter in which both of the input and the beam-steered output free space beams pass therethrough, the single beamsplitter for dividing each of the input and the beam-steered output free space beams into a major portion passing through the single beamsplitter and a minor portion re-directed along an orthogonal monitoring path, the single beamsplitter disposed in optical alignment with the MEMS-based tilt mirror so as to direct the major portion of the beam-steered output free space beam into the output signal path at the common plane P; and
   a monitoring arrangement responsive to the minor portions of the input free space beam and the beam-steered output free space beam for measuring input and output power levels to determine the amount of attenuation created by the position of the tilt mirror.

2. The free space variable optical attenuator as defined in claim 1 wherein the monitoring arrangement comprises
   an input monitoring arrangement disposed to intercept the re-directed, minor portion of the input free space beam, the input monitoring arrangement including an input monitoring photodiode, where a measurement of optical power received by the input monitoring photodiode is indicative of the input power received by the variable optical attenuator; and
   an output monitoring arrangement disposed to intercept the re-directed, minor portion of the beam-steered output free space beam, the output monitoring arrangement including an aperture selected to exhibit a known, constant relationship to an output path from the variable optical attenuator and an output monitoring photodiode disposed in alignment with the aperture such that a measurement of optical power of the beam-steered output free space beam passing through the aperture and received by the monitoring output photodiode, is indicative of the output power exiting the variable optical attenuator.

3. The free space variable optical attenuator as defined in claim 2 wherein the output monitoring arrangement comprises
   a pin hole element disposed between the single beamsplitter and the output monitoring photodiode to intercept the minor portion of the beam-steered output free space beam re-directed by the single beamsplitter, the pin hole element formed to include the aperture through which the minor portion of the beam-steered output free space beam passes prior to reaching the output monitoring photodiode.

4. The free space variable optical attenuator as defined in claim 2 wherein the output monitoring arrangement comprises
   an absorbent coating material disposed on an outer perimeter of an active region of the output monitoring photodiode, the boundaries of the absorbent coating material defining the aperture of the output monitoring arrangement.

5. The free space variable optical attenuator as defined in claim wherein the monitoring arrangement comprises a split detector configuration disposed to receive the minor portion of the beam-steered output free space beam re-directed by the beam splitter, the split detector configuration comprising
   a pair of monitoring photodiodes disposed in a side-by-side relationship, a first monitoring photodiode of the pair of photodiodes measuring a power level associated with the amount of beam-steered output power steered away from a defined aperture, and a second monitoring photodiode of the pair of photodiodes measuring a power level associated with the amount of beam-steered output power passing through a defined aperture; and
   a combiner coupled to outputs from the first and second monitoring photodiodes, wherein a combination of measured powers is indicative of the input power applied to the variable optical attenuator.

6. The free space variable optical attenuator as defined in claim 2, wherein the input monitoring arrangement further comprises
    a focusing lens disposed between the single beamsplitter and the input monitoring photodiode.

7. The free space variable optical attenuator as defined in claim 6, wherein the input monitoring arrangement further comprises
    an optical isolator disposed in the free space beam path between the single beamsplitter and the focusing lensing, the optical isolator for preventing reflected free space beams from re-entering the single beamsplitter.

8. The free space variable optical attenuator as defined in claim 2, wherein the output monitoring arrangement further comprises a focusing lens disposed between the single beamsplitter and the aperture.

9. The free space variable optical attenuator as defined in claim 2, wherein the attenuator further comprises
    a cylindrical lens element disposed in alignment with the common plane P for receiving an input optical signal from the input signal path and collimating the input optical signal, to create the free space input beam applied as an input to the single beamsplitter, the cylindrical lens element also for receiving the beam-steered output free space beam passing through the single beamsplitter and focusing the beam-steered output free space beam to form a focused output free space beam thereafter coupled into the output signal path.

10. The free space variable optical attenuator as defined in claim 9 wherein the attenuator further comprises
    a dual-core optical component disposed at an endface of the cylindrical lens element, a first core of the dual-core optical component for propagating the received input optical signal and coupling the propagating input optical signal into the cylindrical lens, and a second core of the dual-core optical component for receiving the focused output free space beam, wherein the diameter of the second core is related to, the diameter of the output monitoring arrangement aperture so that a selected amount of the power of the focused output free space beam is coupled into the second core to create the attenuated optical signal.

* * * * *